(12) United States Patent
Lacy et al.

(10) Patent No.: US 10,087,776 B2
(45) Date of Patent: Oct. 2, 2018

(54) ARTICLE AND METHOD OF FORMING AN ARTICLE

(71) Applicant: General Electric Company, Schenectady, NY (US)

(72) Inventors: Benjamin Paul Lacy, Greer, SC (US); Srikanth Chandrudu Kottilingam, Greenville, SC (US); David Edward Schick, Greenville, SC (US)

(73) Assignee: General Electric Company, Schenectady, NY (US)

( * ) Notice: Subject to any disclaimer, the term of this patent is extended or adjusted under 35 U.S.C. 154(b) by 256 days.

(21) Appl. No.: 14/847,445

(22) Filed: Sep. 8, 2015

(65) Prior Publication Data
US 2017/0067363 A1    Mar. 9, 2017

(51) Int. Cl.
*F01D 25/12*    (2006.01)
*F01D 5/18*    (2006.01)
(Continued)

(52) U.S. Cl.
CPC ............... *F01D 25/12* (2013.01); *B22F 5/04* (2013.01); *B23K 26/342* (2015.10);
(Continued)

(58) Field of Classification Search
None
See application file for complete search history.

(56) References Cited

U.S. PATENT DOCUMENTS 3,475,107 A * 10/1969 Auxier ................ F01D 5/189
                                                     415/115
3,540,810 A * 11/1970 Kercher ............... F01D 5/189
                                                     415/115
(Continued)

FOREIGN PATENT DOCUMENTS

EP    0 182 588 A1    5/1986
EP    0 599 055 A1    6/1994
(Continued)

OTHER PUBLICATIONS

Extended European Search Report and Opinion issued in connection with related EP Application No. 16185770.1 dated Jan. 5, 2017.
(Continued)

*Primary Examiner* — Peter A Salamon
(74) *Attorney, Agent, or Firm* — McNees Wallace & Nurick LLC

(57) ABSTRACT

A cooling article and method of forming a cooling article are provided. The cooling article includes a body portion separating an inner region and an outer region, an aperture in the body portion, the aperture fluidly connecting the inner region and the outer region, and a reinforcing feature extending at least partially along the body portion, the reinforcing feature being oriented with respect to a build direction. The method includes forming a body portion defining an inner region and an outer region, forming at least one reinforcing feature concurrently with the forming of the body portion, the at least one reinforcing feature extending at least partially along the body portion, and forming an aperture in the
(Continued)

body portion, the aperture fluidly connecting the inner region to the outer region. The forming the body portion, forming the aperture, and forming the at least one reinforcing feature comprises additive manufacturing.

17 Claims, 6 Drawing Sheets

(51) Int. Cl.
    B23K 26/354    (2014.01)
    B23K 26/342    (2014.01)
    B22F 5/04    (2006.01)
(52) U.S. Cl.
    CPC ............ *B23K 26/354* (2015.10); *F01D 5/188* (2013.01); *F01D 5/189* (2013.01); *F05D 2230/31* (2013.01); *F05D 2260/201* (2013.01)

(56) References Cited

U.S. PATENT DOCUMENTS

| | | | |
|---|---|---|---|
| 4,056,332 A * | 11/1977 | Meloni | F01D 5/188 |
| | | | 415/115 |
| 4,252,501 A * | 2/1981 | Peill | F01D 5/189 |
| | | | 415/115 |
| 4,312,624 A * | 1/1982 | Steinbauer, Jr. | F01D 5/189 |
| | | | 415/115 |
| 5,207,556 A * | 5/1993 | Frederick | F01D 5/189 |
| | | | 415/115 |
| 5,464,322 A * | 11/1995 | Cunha | F01D 5/187 |
| | | | 415/115 |
| 5,586,866 A * | 12/1996 | Wettstein | F01D 5/189 |
| | | | 416/96 A |
| 5,623,827 A | 4/1997 | Monty | |
| 5,772,398 A * | 6/1998 | Noiret | F01D 5/189 |
| | | | 415/115 |
| 6,000,908 A | 12/1999 | Bunker | |
| 6,200,087 B1 * | 3/2001 | Tung | F01D 5/186 |
| | | | 415/115 |
| 6,237,344 B1 | 5/2001 | Lee | |
| 6,391,251 B1 * | 5/2002 | Keicher | B05B 7/14 |
| | | | 419/7 |
| 6,406,260 B1 * | 6/2002 | Trindade | F01D 5/187 |
| | | | 415/115 |
| 7,246,993 B2 * | 7/2007 | Bolms | F01D 25/12 |
| | | | 415/116 |
| 7,789,125 B2 | 9/2010 | Mayer et al. | |
| 8,127,552 B2 | 3/2012 | Schumacher et al. | |
| 8,137,056 B2 | 3/2012 | Fujimoto et al. | |
| 8,152,468 B2 | 4/2012 | Propheter-Hinckley et al. | |
| 8,444,376 B2 | 5/2013 | Krueckels et al. | |
| 2004/0226701 A1 | 11/2004 | Lomax, Jr. et al. | |
| 2007/0169992 A1 | 7/2007 | Wasif et al. | |
| 2009/0010765 A1 * | 1/2009 | Propheter-Hinckley | F01D 5/147 |
| | | | 416/97 R |
| 2009/0324385 A1 * | 12/2009 | Liang | F01D 5/187 |
| | | | 415/115 |
| 2010/0124485 A1 * | 5/2010 | Tibbott | F01D 5/188 |
| | | | 415/115 |
| 2010/0232946 A1 * | 9/2010 | Propheter-Hinckley | F01D 5/189 |
| | | | 415/177 |
| 2010/0254824 A1 * | 10/2010 | Naik | F01D 5/186 |
| | | | 416/97 R |
| 2011/0123351 A1 * | 5/2011 | Hada | F01D 5/189 |
| | | | 416/97 R |
| 2013/0081401 A1 | 4/2013 | Kim | |
| 2013/0156549 A1 | 6/2013 | Maldonado | |
| 2014/0064913 A1 | 3/2014 | Adavikolanu et al. | |
| 2014/0093379 A1 * | 4/2014 | Tibbott | F01D 5/189 |
| | | | 416/224 |
| 2014/0093392 A1 | 4/2014 | Tibbott et al. | |
| 2014/0099476 A1 | 4/2014 | Subramanian et al. | |

FOREIGN PATENT DOCUMENTS

| | | |
|---|---|---|
| EP | 0 698 725 A2 | 2/1996 |
| EP | 0 887 515 A1 | 12/1998 |
| EP | 2 256 297 B1 | 12/2010 |
| EP | 2 369 235 A2 | 9/2011 |
| EP | 2 708 296 A2 | 3/2014 |
| EP | 2 716 868 A2 | 4/2014 |
| EP | 2 853 323 A2 | 4/2015 |
| GB | 2 492 374 A | 1/2013 |
| JP | 2011-089461 A | 5/2011 |
| JP | 2012-202342 A | 10/2012 |
| WO | 03/062607 A1 | 7/2003 |
| WO | 2013/160198 A1 | 10/2013 |
| WO | 2015/042009 A1 | 3/2015 |
| WO | 2015/112384 A1 | 7/2015 |

OTHER PUBLICATIONS

Extended European Search Report and Opinion issued in connection with related EP Application No. 16187171.0 dated Apr. 13, 2017.
Extended European Search Report and Opinion issued in connection with related EP Application No. 16187452.4 dated Apr. 13, 2017.
Non-Final Rejection towards related U.S. Appl. No. 14/847409 dated May 8, 2017.
Extended European Search Report and Opinion issued in connection with related EP Application No. 16164625.2 dated Aug. 29, 2016.
Extended European Search Report and Opinion issued in connection with related EP Application No. 16169984.8 dated Sep. 27, 2016.
U.S. Appl. No. 14/688,436, filed Apr. 16, 2015, Lacy et al.
U.S. Appl. No. 14/847,347, filed Sep. 8, 2015, Lacy et al.
U.S. Appl. No. 14/725,374, filed May 29, 2015, Lacy et al.
U.S. Appl. No. 14/847,409, filed Sep. 8, 2015, Lacy et al.

* cited by examiner

ARTICLE AND METHOD OF FORMING AN ARTICLE

STATEMENT REGARDING FEDERALLY SPONSORED RESEARCH

This invention was made with government support under contract number DE-FC26-05NT42643 awarded by the Department of Energy. The government has certain right in this invention.

FIELD OF THE INVENTION

The present invention is directed to an article and a method of forming an article. More particularly, the present invention is directed to a cooling article and a method of forming a cooling article.

BACKGROUND OF THE INVENTION

Turbine systems are continuously being modified to increase efficiency and decrease cost. One method for increasing the efficiency of a turbine system includes increasing the operating temperature of the turbine system. To increase the temperature, the turbine system must be constructed of materials which can withstand such temperatures during continued use.

In addition to modifying component materials and coatings, one common method of increasing temperature capability of a turbine component includes the use of complex cooling channels. The complex cooling channels are often formed in metals and alloys used in high temperature regions of gas turbines. One current method of forming the complex cooling channels includes drilling or electrical discharge machining. In addition to being expensive, it can be difficult to form complex cooling channels using drilling or electrical discharge machining. For example, with either drilling or electrical discharge machining, it is difficult to form shaped holes, and in particular, small shaped holes.

An alternative method of forming complex cooling channels may include additive manufacturing. However, additive manufacturing of certain articles can be difficult, and is generally limited with respect to various geometries. Specifically, additive manufacturing of thin vertical structures, such as impingement sleeves, typically results in collapse during manufacturing. Accordingly, most impingement sleeves are currently formed from rolled up pieces of sheet metal.

An article and method of forming an article that show one or more improvements in comparison to the prior art would be desirable in the art.

BRIEF DESCRIPTION OF THE INVENTION

In an embodiment, a cooling article includes a body portion separating an inner region and an outer region, an aperture in the body portion, the aperture fluidly connecting the inner region and the outer region, and a reinforcing feature extending at least partially along the body portion, the reinforcing feature being oriented with respect to a build direction.

In another embodiment, a method of forming a cooling article includes forming a body portion defining an inner region and an outer region, forming at least one reinforcing feature concurrently with the forming of the body portion, the at least one reinforcing feature extending at least partially along the body portion, and forming an aperture in the body portion, the aperture fluidly connecting the inner region to the outer region. The forming the body portion, forming the aperture, and forming the at least one reinforcing feature comprises additive manufacturing.

In another embodiment, a method of forming a cooling article includes forming a body portion defining an inner region and an outer region, forming at least one reinforcing feature concurrently with the forming of the body portion, the at least one reinforcing feature extending at least partially along the body portion, forming an aperture in the body portion, the aperture fluidly connecting the inner region to the outer region, and removing the at least one reinforcing feature. The forming the body portion, forming the aperture, and forming the at least one reinforcing feature comprises additive manufacturing.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are a cooling article and a method of forming a cooling article. Embodiments of the present disclosure, for example, in comparison to concepts failing to include one or more of the features disclosed herein, facilitate additive manufacturing of cooling articles, facilitate additive manufacturing of cooling articles in a vertical direction, increase cooling article support during manufacturing, decrease cooling article collapse during manufacturing, increase efficiency, facilitates forming of cooling features having increased complexity, facilitate formation of complex cooling channels, or a combination thereof.

Figure 1:
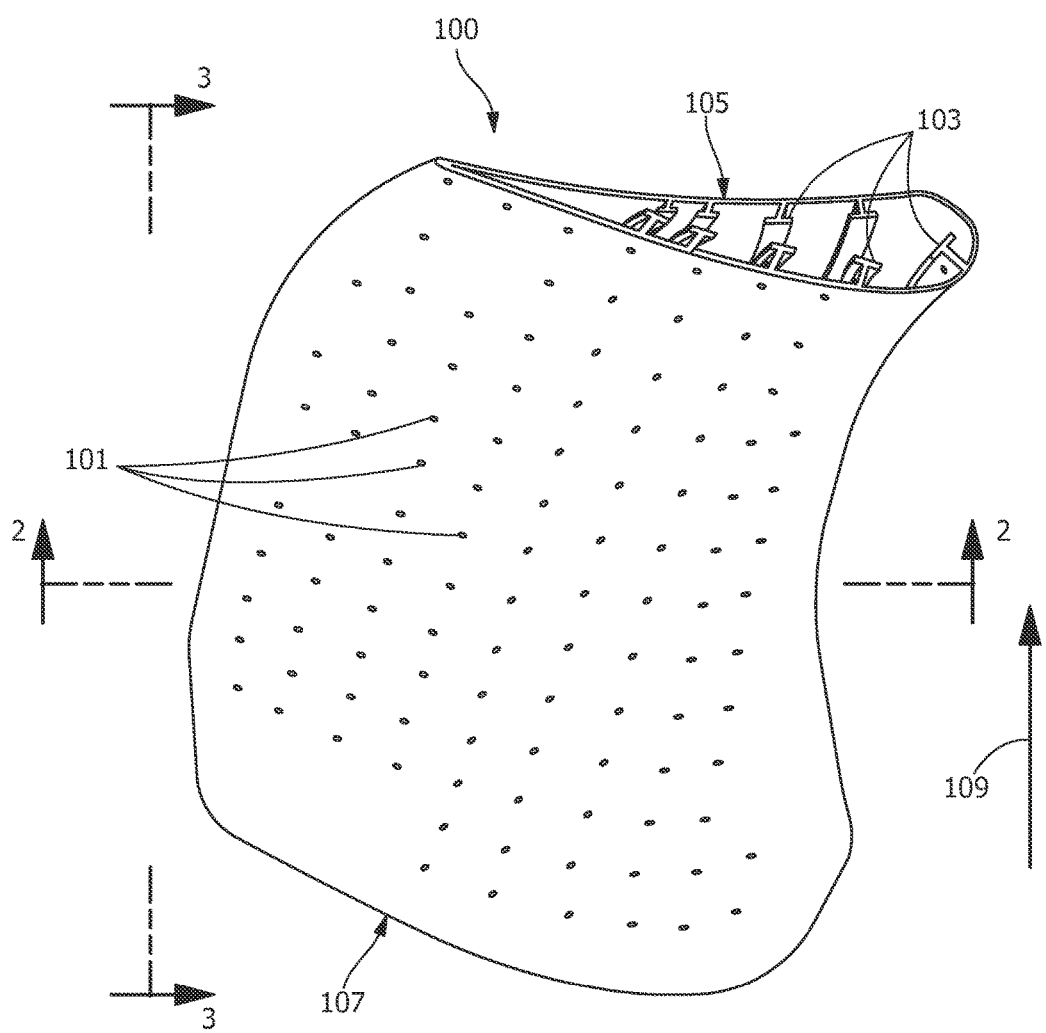
FIG. 1 is a perspective view of a cooling article, according to an embodiment of the disclosure.
Figure 2:
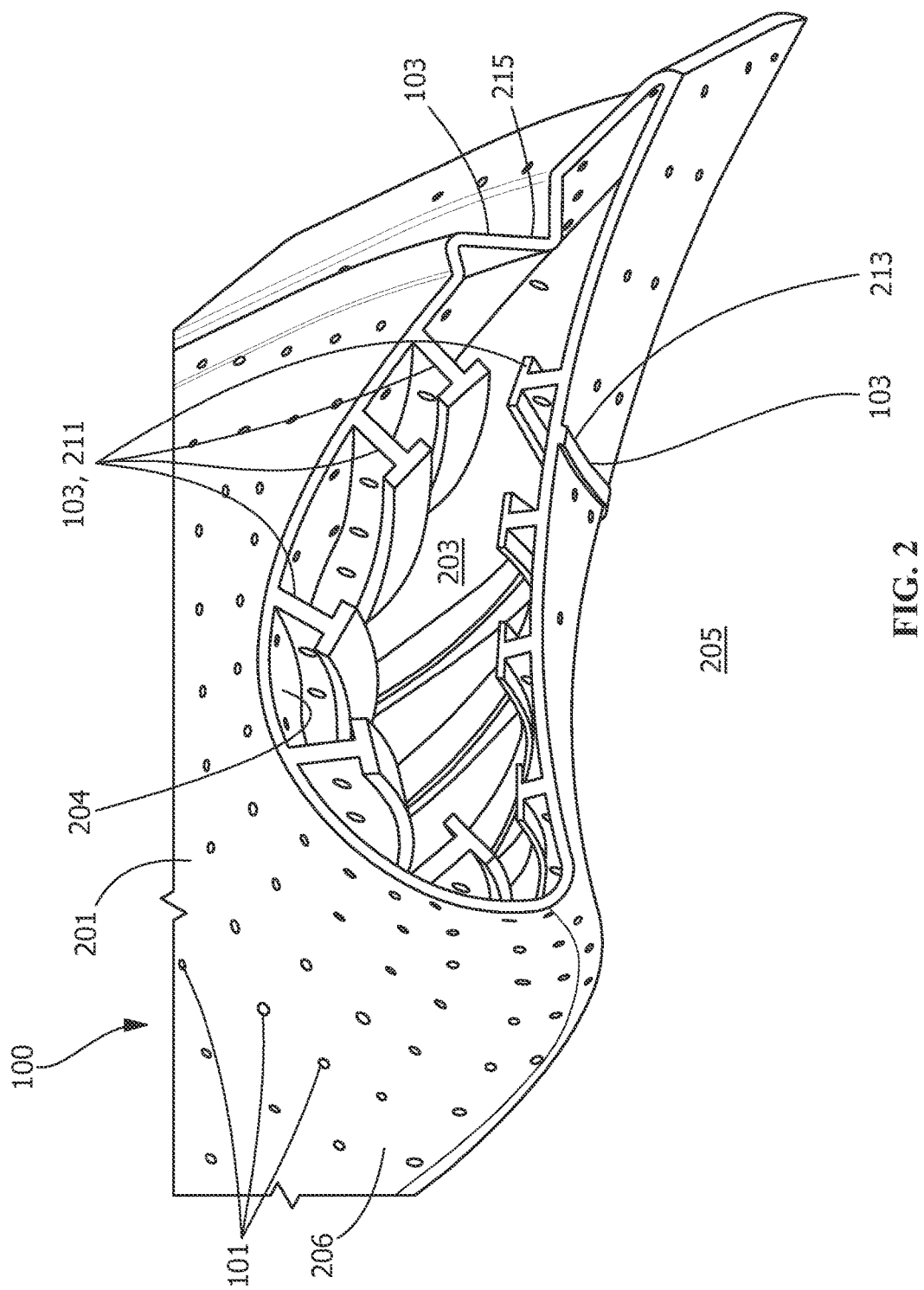
FIG. 2 is a section view of a cooling article, according to an embodiment of the disclosure.
Figure 3:
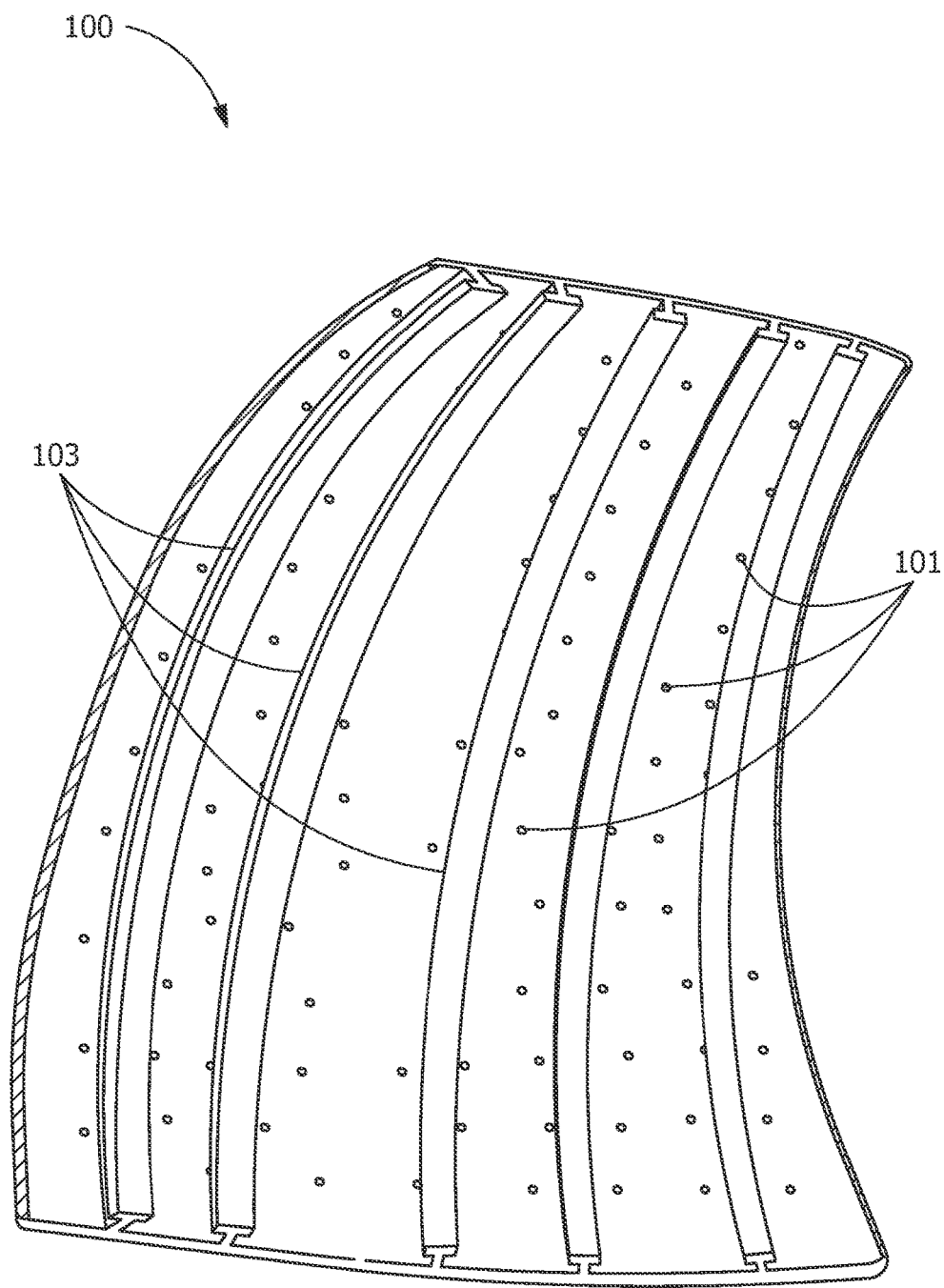
FIG. 3 is a section view of a cooling article, according to an embodiment of the disclosure.

A cooling article 100 includes any suitable article for facilitating cooling of a turbine component. In one embodiment, as illustrated in FIGS. 1-3, the cooling article 100 includes one or more apertures 101 and/or one or more reinforcing features 103 formed therein. For example, in another embodiment, the cooling article 100 includes an impingement sleeve having a plurality of apertures 101 and a plurality of reinforcing features 103. Although primarily described herein with regard to an impingement sleeve, as will be understood by those skilled in the art, the cooling article 100 may include any other suitable article, such as, but not limited to, an impingement plate, multiple impingement plates, any other article configured for insertion within a component, or a combination thereof.

Referring to FIG. 2, a body portion 201 of the cooling article 100 defines and/or separates an inner region 203 and an outer region 205. The body portion 201 includes an inner surface 204, which faces the inner region 203, and an outer surface 206, which faces the outer region 205. The one or more apertures 101 and/or the one or more reinforcing features 103 are formed on and/or in the body portion 201. In one embodiment, the one or more apertures 101 are formed in the body portion 201, fluidly connecting the inner region 203 to the outer region 205 and providing fluid flow between the inner region 203 and the outer region 205. For example, the apertures 101 may extend between the inner surface 204 and the outer surface 206, facilitating a flow of cooling fluid from the inner region 203 to the outer region 205.

Each of the apertures 101 includes any suitable geometry for fluidly connecting the inner region 203 and the outer region 205. Suitable geometries include, but are not limited to, circular, substantially circular, round, substantially round, oval, non-round, square, triangular, star shaped, polygonal, varied, irregular, any other geometrical shape, or a combination thereof. Additionally, the apertures 101 include any suitable orientation and/or spacing for facilitating cooling flow. Suitable spacing between the apertures 101 includes, but is not limited to, even, uniform, varied, gradient, sectioned, or a combination thereof. The geometry and/or spacing of the apertures 101 may be uniform, substantially uniform, or varied throughout the cooling article 100, with the geometry and/or spacing of each of the apertures 101 being the same, substantially the same, and/or different from one or more other apertures 101 in the cooling article 100.

The one or more reinforcing features 103 are formed on and/or in the body portion 201, each of the one or more reinforcing features 103 extending at least partially between a first end 105 and a second end 107 of the cooling article 100. For example, in one embodiment, the one or more reinforcing features 103 extend at least partially along the inner surface 204 of the body portion 201, forming internal reinforcing features 211 extending into the inner region 203. In another embodiment, the one or more reinforcing features 103 extend at least partially along the outer surface 206 of the body portion 201, forming external reinforcing features 213 extending into the outer region 206. In a further embodiment, the one or more reinforcing features 103 include an integral reinforcing feature 215 formed within and extending at least partially along the body portion 201. Suitable integral reinforcing features 215 include, but are not limited to, a wrinkle, a section of increased thickness, a corrugation of the inner surface 204 and/or the outer surface 206, any other modification to the body portion 201, or a combination thereof. In addition, the corrugation may include any one or more cross sectional shapes, such as, but not limited to, sinusoidal, sharp angled (see FIG. 2), wavy, square wave, sawtooth, or a combination thereof.

A positioning, orientation, amount, and/or geometry of the reinforcing feature(s) 103 is selected to provide a desired support during an additive manufacturing of the body portion 201. As discussed in detail above, suitable positioning of the reinforcing feature(s) 103 includes on the outer surface 206 of the body portion 201, on the inner surface 204 of the body portion 201, and/or within the body portion 201. For example, although illustrated in FIG. 2 as including each of the internal reinforcing feature 211, the external reinforcing feature 213, and the integral reinforcing feature 215, as will be appreciated by those skilled in the art, the cooling article 100 is not so limited and may include only the internal reinforcing feature 211, only the external reinforcing feature 213, only the integral reinforcing feature 215, or any combination thereof.

Suitable orientations for supporting the body portion 201 include, but are not limited to, vertical, angled, spiral, stepped, curved, perpendicular to the build direction, parallel to the build direction, otherwise oriented with respect to the build direction, or a combination thereof. The orientation of each reinforcing feature 103 may be the same, substantially the same, or varied along the body portion 201 and/or with respect to at least one other reinforcing feature 103. For example, as illustrated in FIG. 3, the reinforcing features 103 are substantially vertical, curved, and varied along the body portion 201 and/or between individual reinforcing features 103.

Suitable arrangements of the reinforcing feature 103 include, but are not limited to, a single reinforcing feature 103, multiple reinforcing features 103, or a plurality of the reinforcing features 103. In one embodiment, the arrangement of the reinforcing features 103 is selected based upon a thickness and/or height of the body portion 201. For example, shorter and/or thicker body portions 201 may include a relatively decreased amount of the reinforcing features 103, whereas longer and/or thinner body portions 201 may include a relatively increased amount of the reinforcing features 103. Additionally, a dimension and/or spacing of the reinforcing features 103 may be selected to provide the desired support of the body portion 201. The dimension and/or spacing of the reinforcing features 103 is based at least partially upon the amount of reinforcing features 103 provided, and may be the same, substantially the same, or varied along the body portion 201 and/or between individual reinforcing features 103. For example, thicker reinforcing features 103 and/or a decreased spacing between reinforcing features 103 may be provided for a relatively longer and/or thinner body portion 201, whereas thinner reinforcing features 103 and/or a decreased spacing between reinforcing features 103 may be provided for a relatively shorter and/or thicker body portion 201.

Suitable geometries of the reinforcing features 103 include, but are not limited to, T-shaped, L-shaped, I-shaped, F-shaped, E-shaped, any other regular or irregular geometrical shape, or a combination thereof. Additionally or alternatively, the geometry of the one or more reinforcing features 103 may include a non-solid portion and/or configuration, such as, but not limited to, hollow, porous, webbed, cross-hatched, or a combination thereof. The geometry of the one or more reinforcing features 103 may be the same, substantially the same, or varied along the body portion 201 and/or between individual reinforcing features 103.

In one embodiment, the geometry of the reinforcing feature(s) 103 modifies fluid flow within the inner region 203. In another embodiment, as illustrated in FIG. 2, at least one of the one or more reinforcing features 103 includes one or more openings 221 formed therein, the one or more openings 221 providing fluid flow therethrough. In a further embodiment, varying a size, orientation, and/or amount of the openings 221 in the reinforcing features 103 varies the fluid flow through the reinforcing features 103, which varies the fluid flow within the inner region 203. By varying fluid flow within the inner region 203, the openings 221 in the reinforcing features 103 vary fluid flow through the apertures 101, facilitate increased control over fluid flow, and/or facilitate increased control over impingement cooling flow.

Figure 4:
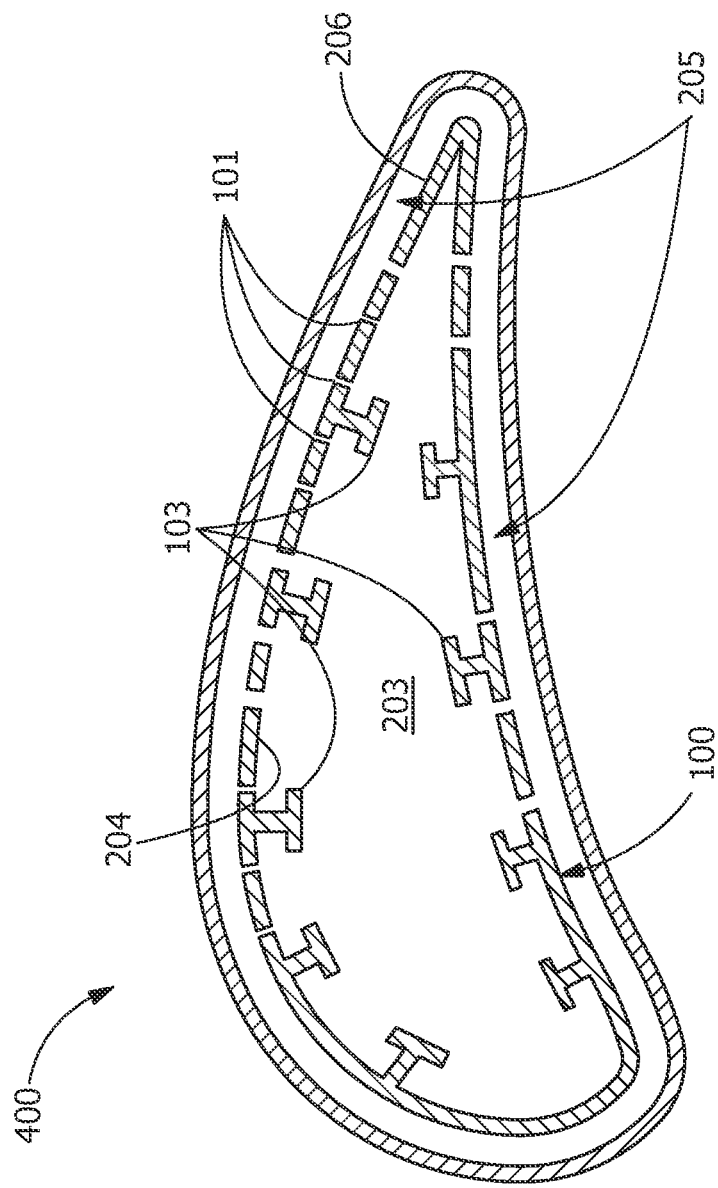
FIG. 4 is a section view of a cooling article positioned within a component, according to an embodiment of the disclosure.

For example, as illustrated in FIG. 4, in one embodiment, the cooling article 100 is configured for insertion and/or positioning within a component 400. When inserted and/or positioned within the component 400, the outer region 205 of the cooling article 100 extends between the outer surface 206 of the cooling article and an inner surface 404 of the component 400. Additionally, when the cooling article 100 is inserted and/or positioned within the component 400, the flow of fluid through the apertures 101 provides cooling of the component 400. For example, a cooling fluid provided to the inner region 203 of the cooling article 100 may pass through the apertures 101 to the outer region 205 where the cooling fluid contacts the inner surface 404 of the component 400 and provides impingement cooling of the component 400. The orientation and/or spacing of the apertures 101 at least partially determines an amount, direction, and/or concentration of the fluid passing from the inner region 203 to the outer region 205.

In one embodiment, the reinforcing feature(s) 103 formed according to one or more of the embodiments disclosed herein permit additive manufacturing of the cooling article 100. In another embodiment, the reinforcing feature(s) 103 facilitate additive manufacturing of the body portion 201 having an increased length and/or decreased thickness as compared to cooling articles formed without the reinforcing feature(s) 103. In a further embodiment, the reinforcing feature(s) 103 facilitate a vertical build of the cooling article 100 with additive manufacturing. As used herein, the term vertical refers to a direction that is aligned or substantially aligned with the direction of gravity and/or a build direction of the cooling article 100. For example, referring to FIG. 1, the build may include forming the cooling article 100 in a vertical build direction 109 extending from the second end 107 to the first end 105.

During the vertical build and/or the formation of the body portion 201 having an increased length and/or decreased thickness, the reinforcing feature(s) 103 increase a stability of the body portion 201. The increase in stability provided by the reinforcing feature(s) 103 decreases or eliminates collapse of the body portion 201 during manufacturing and/or maintains a desired geometry of the body portion 201, which permits the additive manufacturing of the cooling article 100. Additionally, the additive manufacturing of the cooling article 100 permits formation of the cooling article 100 as a single piece and/or formation of cooling features having increased complexity as compared to cooling articles formed without additive manufacturing. The increased complexity of the cooling features, such as the apertures 101, decreases use of cooling fluid, permits use of increased operating temperatures, increases thru put, increases efficiency, increases impingement heat transfer coefficients (HTCs), and/or facilitates reusing of cooling flows.

Figure 5:
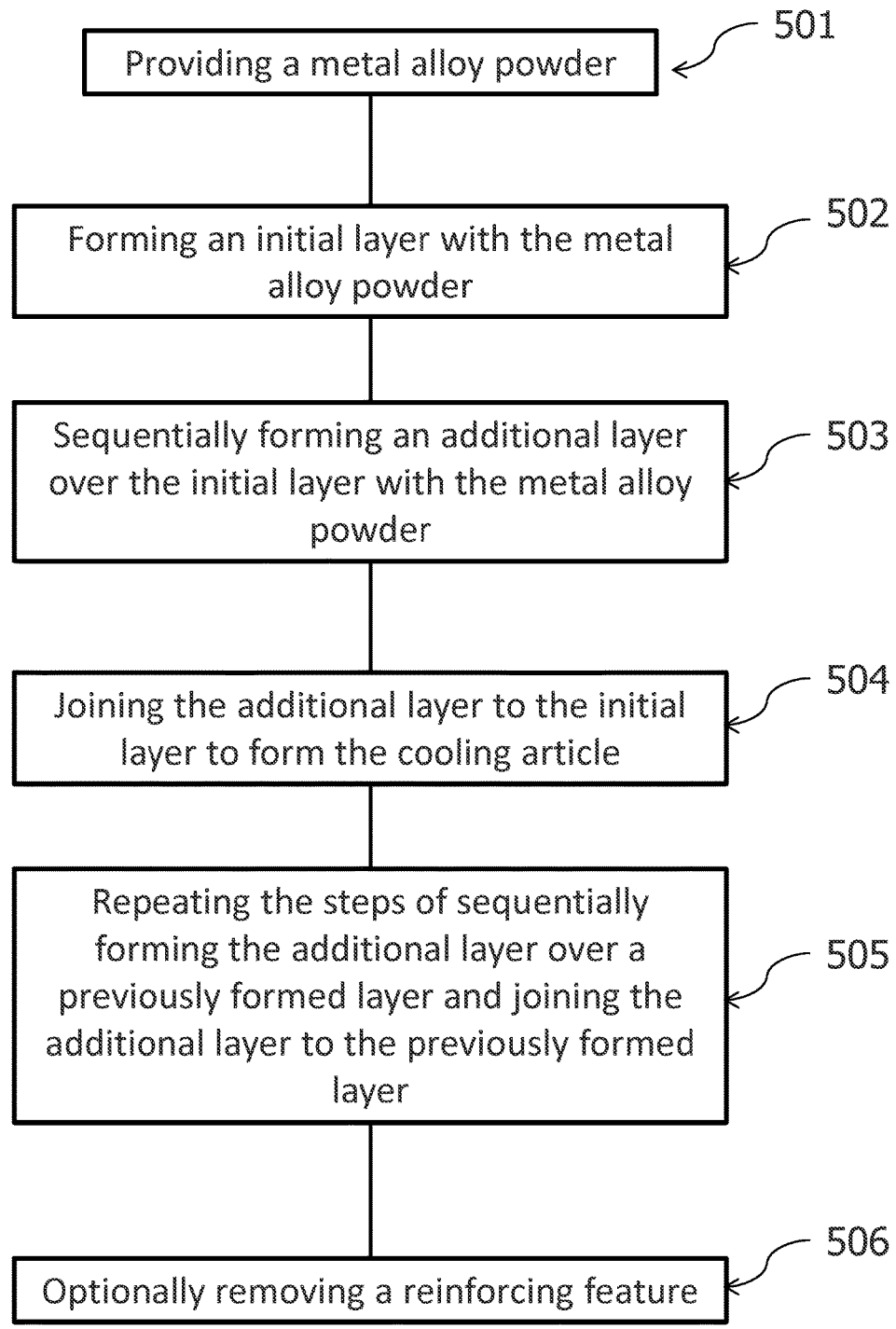
FIG. 5 is a process view of a method of forming a cooling article, according to an embodiment of the disclosure.
Figure 6:
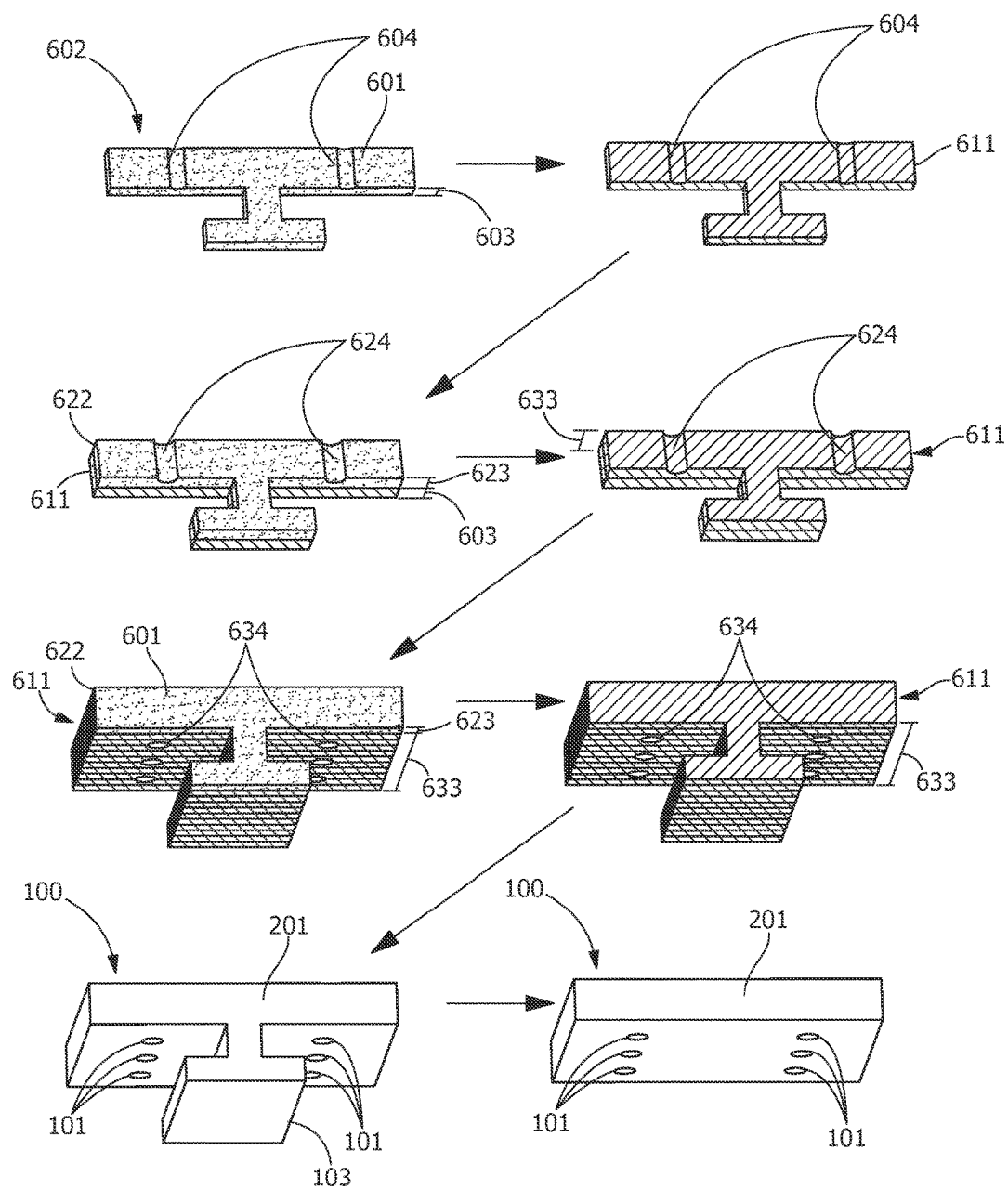
FIG. 6 is a schematic view of a method of forming a cooling article, according to an embodiment of the disclosure.

The additive manufacturing of the cooling article 100 and/or the body portion 201 including the reinforcing feature(s) 103 includes any suitable additive manufacturing method 500. Referring to FIGS. 5-6, in one embodiment, the additive method 500 includes making and/or forming net or near-net shape cooling articles 100 and/or reinforcing feature 103. As used herein, the phrase "near-net" refers to the cooling article 100 and/or reinforcing feature(s) 103 being formed with a geometry and size very similar to the final geometry and size of the cooling article 100 and/or reinforcing feature(s) 103, requiring little or no machining and processing after the additive method 500. As used herein, the phrase "net" refers to the cooling article 100 and/or reinforcing feature(s) 103 being formed with a geometry and size requiring no machining and processing.

According to one or more of the embodiments disclosed herein, the additive method 500 includes integrally forming the one or more aperture 101 and/or the one or more reinforcing feature 103 integral with the cooling article 100. Alternatively, as will be appreciated by those skilled in the art, at least one of the aperture(s) 101 may be machined into the cooling article 100 after the additive method 500, without affecting the net or near-net geometry of the cooling article 100. In addition, after forming the cooling article 100 including the reinforcing feature(s) 103, the reinforcing feature(s) 103 may be removed, such as by grinding, to form the cooling article 100 devoid or substantially devoid of the reinforcing feature(s) 103 (see FIG. 6). In certain embodiments, the reinforcing feature(s) 103 intermittently contact the body portion 201, facilitating easier removal of the reinforcing feature(s) 103 if desired.

The additive method 500 includes any manufacturing method for forming the cooling article 100 and/or reinforcing feature(s) 103 through sequentially and repeatedly depositing and joining material layers. Suitable manufacturing methods include, but are not limited to, the processes known to those of ordinary skill in the art as Direct Metal Laser Melting (DMLM), Direct Metal Laser Sintering (DMLS), Laser Engineered Net Shaping, Selective Laser Sintering (SLS), Selective Laser Melting (SLM), Electron Beam Melting (EBM), Fused Deposition Modeling (FDM), or a combination thereof. In one embodiment, for example, the additive method 500 includes providing a metal alloy powder 601 (step 501); forming an initial layer 602 with the metal alloy powder 601 (step 502); sequentially forming an additional layer 622 over the initial layer 602 with the metal alloy powder 601 (step 503); and joining the additional layer 622 to the initial layer 602 to form the cooling article 100 and/or reinforcing feature(s) 103 (step 504). In another embodiment, the additive method 500 includes repeating the steps of sequentially forming the additional layer 622 over a previously formed layer and joining the additional layer 622 to the previously formed layer (step 505) until the cooling article 100 and/or reinforcing feature(s) 103 having a predetermined thickness and/or a predetermined shape are obtained. The previously formed layer includes any portion 611 of the cooling article 100 and/or reinforcing feature(s) 103 including the initial layer 602 and/or any other additional layer(s) 622 directly or indirectly joined to the initial layer 602.

The initial layer 602 includes a preselected thickness 603 and a preselected shape. When forming the one or more apertures 101, at least one first variation 604 in the preselected thickness 603 may be provided, the at least one first variation 604 corresponding to a portion of the one or more apertures 101. Each of the additional layers 622 includes a second preselected thickness 623 and a second preselected shape. The second preselected shape includes at least one second variation 624 corresponding to the at least one first variation 604 in the initial layer 602, a shape corresponding to the outer surface 206, and/or a shape corresponding to the one or more reinforcing features 103. The second preselected thickness 623 and/or the second preselected shape may be the same, substantially the same, or different between one or more of the additional layers 622. When joined, the preselected thickness 603 of the initial layer 602 and the second preselected thickness 623 of the additional layer(s) 622 form a combined thickness 633 of the portion 611. Additionally, the at least one first variation 604 and the corresponding at least one second variation 624 form one or more combined openings 634 in the portion 611. Once the cooling article 100 is formed, the one or more combined opening 634 form the one or more apertures 101 fluidly connecting the inner region 203 to the outer region 205 of the cooling article 100.

In one embodiment, the additive method 500 includes the DMLM process. In another embodiment, the DMLM process includes providing the metal alloy powder 601 and depositing the metal alloy powder 601 to form an initial powder layer. The initial powder layer has the preselected thickness 603 and the preselected shape including the at least one first variation 604. In a further embodiment, the DMLM process includes providing a focused energy source 610, and directing the focused energy source 610 at the initial powder layer to melt the metal alloy powder 601 and transform the initial powder layer to the portion 611 of the cooling article 100 and/or reinforcing feature(s) 103. Suitable focused energy sources include, but are not limited to, laser device, an electron beam device, or a combination thereof.

Next, the DMLM process includes sequentially depositing additional metal alloy powder 601 over the portion 611 of the cooling article 100 and/or reinforcing feature(s) 103 to form the additional layer 622 having the second preselected thickness 623 and the second preselected shape. After depositing the additional layer 622 of the metal alloy powder 601, the DMLM process includes melting the additional layer 622 with the focused energy source 610 to increase the combined thickness 633 and form at least a portion of the cooling article 100. The steps of sequentially depositing the additional layer 622 of the metal alloy powder 601 and melting the additional layer 622 may then be repeated to form the net or near-net shape cooling article 100 and/or reinforcing feature(s) 103. For example, the steps may be repeated until the cooling article 100 having the predetermined thickness, the predetermined shape, the one or more apertures 101, and/or the one or more reinforcing feature(s) 103 is obtained.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. An impingement sleeve, comprising:
   a body portion separating an inner region and an outer region of the impingement sleeve;
   a plurality of apertures in the body portion, the plurality of apertures fluidly connecting the inner region and the outer region; and
   a reinforcing feature extending from the body portion into the inner region;
   wherein the impingement sleeve is formed by additive manufacturing; and
   wherein the reinforcing feature includes a shape selected from the group consisting of T, L, I, F, E, and combinations thereof.

2. The impingement sleeve of claim 1, wherein the reinforcing feature includes at least one cooling feature formed thereon.

3. The impingement sleeve of claim 2, wherein the cooling feature is selected from the group consisting of a cooling hole, a cooling channel, and a combination thereof.

4. The impingement sleeve of claim 1, further comprising at least one additional reinforcing feature.

5. The impingement sleeve of claim 4, wherein a spacing is varied between features selected from the group consisting of the reinforcing feature, the at least one additional reinforcing feature, and a combination thereof.

6. An impingement sleeve, comprising:
   a body portion separating an inner region and an outer region of the impingement sleeve;
   a plurality of apertures in the body portion, the plurality of apertures fluidly connecting the inner region and the outer region;
   a first reinforcing feature extending from the body portion into the inner region; and
   at least one additional reinforcing feature selected from the group consisting of an external reinforcing feature and an integral reinforcing feature;
   wherein the body portion, the plurality of apertures, and the reinforcing feature of the impingement sleeve are formed by additive manufacturing.

7. The impingement sleeve of claim 6, wherein the first reinforcing feature includes at least one cooling feature formed thereon.

8. The impingement sleeve of claim 7, wherein the cooling feature is selected from the group consisting of a cooling hole, a cooling channel, and a combination thereof.

9. The impingement sleeve of claim 6, wherein a spacing is varied between features selected from the group consisting of the first reinforcing feature, the at least one additional reinforcing feature, and a combination thereof.

10. A method of forming an impingement sleeve, the method comprising:
    forming, by additive manufacturing, a body portion defining an inner region and an outer region of the impingement sleeve;
    forming, by additive manufacturing, a plurality of apertures in the body portion, the plurality of apertures fluidly connecting the inner region and the outer region; and
    forming, by additive manufacturing, a first reinforcing feature with the forming of the body portion, the first reinforcing feature extending from the body portion into the inner region and including a shape selected from the group consisting of T, L, I, F, E, and combinations thereof.

11. The method of claim 10 further comprising forming at least one cooling feature on the first reinforcing feature.

12. The method of claim 11, wherein the cooling feature is selected from the group consisting of a cooling hole, a cooling channel, and a combination thereof.

13. The method of claim 10, further comprising forming, by additive manufacturing, at least one additional reinforcing feature with the forming of the body portion.

14. The method of claim 13 further comprising varying a spacing between features selected from the group consisting of the first reinforcing feature, the at least one additional reinforcing feature, and a combination thereof, during additive manufacturing.

15. The method of claim 13 further comprising orienting the at least one additional reinforcing feature to a build direction of the additive manufacturing to provide support to the body portion during the additive manufacturing of the impingement sleeve.

16. The method of claim 10 further comprising orienting, arranging, and disposing the first reinforcing feature with respect to a build direction of the additive manufacturing to provide support to the body portion during the additive manufacturing of the impingement sleeve.

17. The method of claim 10 further comprising removing the first reinforcing feature from the impingement sleeve.

* * * * *